United States Patent [19]
Sato

[11] Patent Number: 5,768,641
[45] Date of Patent: Jun. 16, 1998

[54] CAMERA WITH CHARACTER MARK DISPLAY DEVICE

[76] Inventor: Masaaki Sato, c/o Sato Consulting Office 2-50-5 Mejirodai, Hachioji-shi, Tokyo 193, Japan

[21] Appl. No.: 843,068

[22] Filed: Apr. 11, 1997

[30]  Foreign Application Priority Data

Apr. 11, 1997 [JP] Japan .................. 8-123871

[51] Int. Cl.$^6$ .................. G03B 17/24
[52] U.S. Cl. .................. 396/317
[58] Field of Search .................. 396/182, 317

[56]  References Cited

U.S. PATENT DOCUMENTS

5,486,885  1/1996  Matsumoto .

*Primary Examiner*—David M. Gray
*Attorney, Agent, or Firm*—Kanesaka & Takeuchi

[57]  ABSTRACT

A camera with a character mark display device is formed of a main body for a camera, and a light shielding wall inside the camera. The main body includes a dark box between a photographic lens and an exposure portion to locate a photographic film. The light shielding wall divides the dark box into a first dark section and a second dark section. The photographic lens is located in the first dark section for exposing an image of a subject passing through the photographic lens onto the photographing film. In the second dark section, there are disposed a character film for displaying a character mark, and a strobe flash tube as a light source for exposing the character mark onto a part of the photographic film. When a shutter for the lens is opened, the strobe flash tube is irradiated equally to expose the character mark onto the photographic film.

11 Claims, 6 Drawing Sheets

CAMERA WITH CHARACTER MARK DISPLAY DEVICE

BACKGROUND OF THE INVENTION AND RELATED ART STATEMENT

The invention relates to a camera with a character mark display device, and more particularly, a camera in which a part of an image being photographed on a film by introducing light from a photographic lens is intercepted, and specific characters or images can be added in the intercepted part.

In U.S. Pat. No. 5,486,885, there has been disclosed a character image display apparatus, in which a part of an image photographed on a film by introducing light from a photographic lens is intercepted, and specific characters or images, for example a mark of a specific maker or manufacturer, are exposed or added on the intercepted part, to thereby provide a camera for advertisement or commemoration. The present invention is directed to improve the above invention from other viewpoints.

In the character image display apparatus of U.S. Pat. No. 5,486,885, light from a strobe flash is taken through a photoconductor, such as an optical fiber, into a diffusion block, and a character mark is exposed onto a part of a photographed image by light uniformed at the diffusion block. However, even when the strobe flash is not actuated, the film contacting the character mark is exposed by external light entering from an end surface of the photoconductor disposed in the vicinity of a strobe flash tube. Thus, it is necessary that the photoconductor is extended to a lens shutter to be divided into a half by a shutter blade so as to intercept light by the shutter blade while the photograph is not taken. Therefore, a cost increases for the arrangement of the photoconductor inside the camera.

Also, it is desired that the character image is made in an elongated rectangular shape including a side of an exposure window so that a record with regard to a photograph can be written by a ballpoint pen in a blank space of the printed picture with the character mark. In the character image with the elongated rectangular shape, a length of the diffusion block must be extended. In this case, it is technically possible to equally diffuse the light of the photoconductor throughout the entire length of the elongated diffusion block, but it requires high cost.

Accordingly, one object of the invention is to solve the aforementioned problem and to provide a camera with a character mark display device, which can lower a cost by directly using a strobe flash tube instead of using the photoconductor, such as an optical fiber.

Another object of the invention is to provide a camera with a character mark display device as stated above, which can facilitate assembly of the strobe flash tube for exposing the character mark into a camera, and reduce processes of wiring therefor.

A further object of the invention is to provide a camera with a character mark display device as state above, which can equally expose the character image.

A still further object of the invention is to provide a camera with a character mark display device as state above, which can secure an electrical discharge in the strobe flash tube.

Further objects and advantages thereof will be apparent from the following description of the invention.

SUMMARY OF THE INVENTION

To achieve the above object, the present invention provides a camera provided with a character mark display device basically formed of a main body, a light shielding wall, and a character film. The main body includes a photographic lens, an exposure portion to locate a photographic film, and a dark box disposed between the photographic lens and the exposure portion. The light shielding wall is disposed in the dark box for dividing the dark box into a first dark section and a second dark section. The photographic lens is located in the first dark section for exposing an image of a subject passing through the photographic lens onto the photographing film.

In the second dark section, there are disposed the character film for displaying a character mark onto the photographic film, and a first strobe flash tube as a light source for exposing the character mark onto the photographic film. When a shutter for the lens is opened, the first strobe flash tube is irradiated to expose the character mark onto the photographic film.

The camera may further include a second strobe flash tube as a flash light source for illuminating the subject, a first luminescent circuit for the first strobe flash tube, and a second luminescent circuit for the second strobe flash tube. At least a part of the first luminescent circuit is used in common with the second luminescent circuit.

Preferably, the first strobe flash tube is connected parallel to the second strobe flash tube. Also, a resistor is connected in series to the first strobe flash tube. The second strobe flash tube is disposed parallel to a series connection of the resistor and the first strobe flash tube. The resistor may be formed of a plurality of resistors, wherein one of resistors can be selected by a switch.

According to another aspects of the present invention, the main body includes a unit fitting part in the second dark section. Also, the light shielding wall is formed of a unit for enclosing the second dark section. The unit includes side walls, a bottom part and a front part for holding the character film thereon and located near the photographic film. The unit receives the first strobe flash tube therein and is attached to the unit fitting part at the bottom part.

Preferably, an outer tube wall of the first strobe flash tube facing the character film may be provided with a shielding plate to equally expose the character film. Also, a condenser may be situated parallel between an anode and a cathode of the first strobe flash tube.

DETAILED DESCRIPTION OF PREFERRED EMBODIMENTS

Embodiments of the present invention are explained with reference to the drawings, wherein the invention is used in a film with a lens or a disposable camera.

Figure 1A:
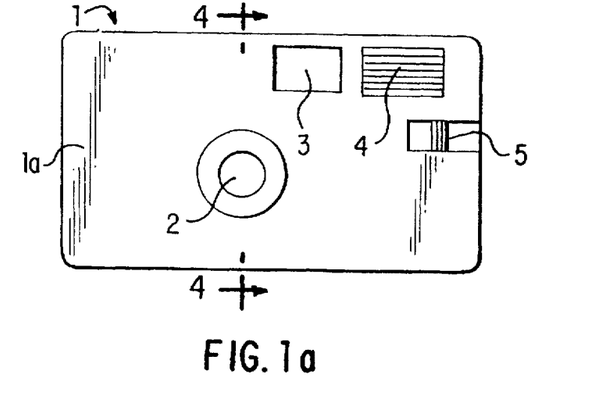
FIG. 1(a) is a front view of a camera with a character mark display device according to an embodiment of the present invention.
Figure 1B:
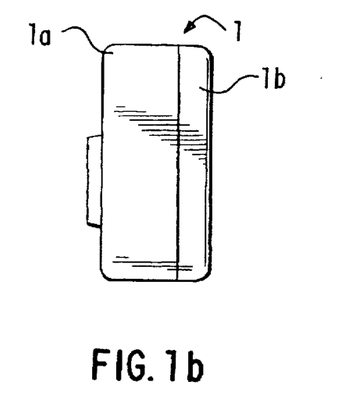
FIG. 1(b) is a side view thereof.
Figure 2:
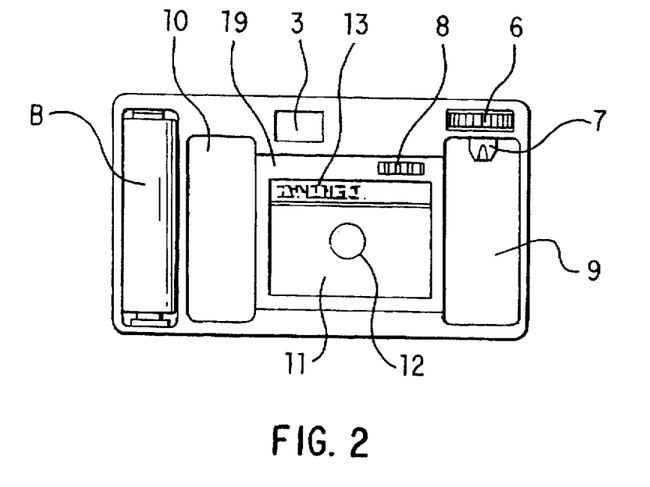
FIG. 2 is a rear view of the camera in FIG. 1(a) in which a back cover and a film are removed.
Figure 5:
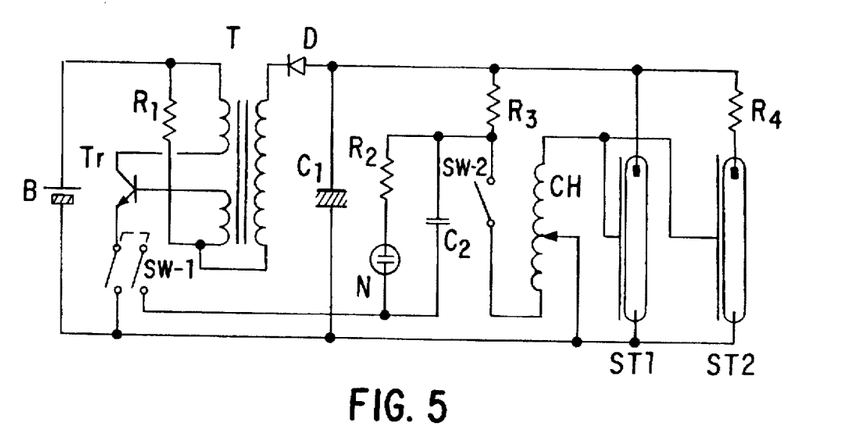
FIG. 5 is a diagram of a strobe flash luminescent circuit according to an embodiment of the invention.

In FIGS. 1(a), 1(b) and 2, numeral 1 designates a camera which is formed of a main body 1a and a back cover 1b; numeral 2 designates a photographic lens; 3 designates a viewfinder lens; 4 designates a transparent cover of a strobe flash tube for photographing (ST1 in FIG. 5) which illuminates a subject to be photographed; and 5 designates a slide button for turning ON or OFF a power switch of a strobe flash circuit (SW-1 in FIG. 5).

Numeral 6 designates a winding knob for a photographing film; 7 designates a winding rod of the photographing film; 8 designates a sprocket; 9 designates a film chamber for accommodating the photographed film; 10 designates a film chamber for accommodating an unused film; and B designated a power source battery for the strobe flash.

Numeral 11 designates a first dark box; 12 designates a shutter blade; and 13 designates a positive film with characters or images, for example, "CENTRAL", or a printed film (hereinafter, referred as a character film).

Figure 3:
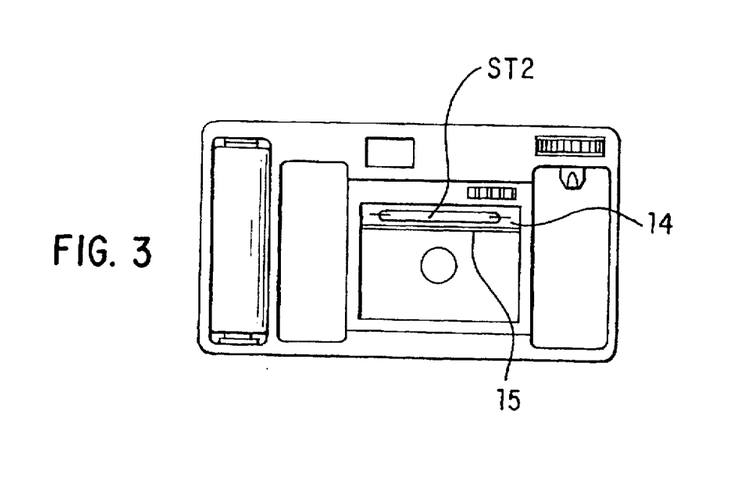
FIG. 3 is a rear view of the camera in FIG. 2 in which a character film and a character film holder are further removed.
Figure 4:
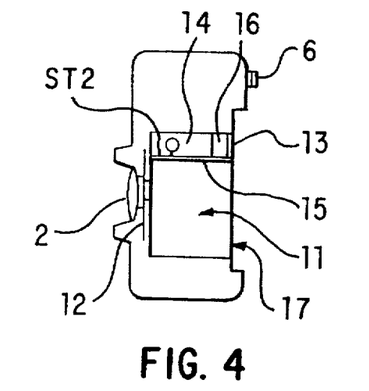
FIG. 4 is an explanatory sectional view taken along line 4—4 in FIG. 1.

As shown in FIGS. 3 and 4, a light shielding wall 15 is disposed in a dark box formed between the photographic lens 2 in the main body 1a and an exposure window 17, and the dark box is divided into the first dark box 11 and a second dark box 14.

The second dark box 14 is an independent dark box for exposing the character mark, and at the bottom thereof, a strobe flash tube ST2 for exposing the character mark is stored. At an open side (a photographing film side) of the second dark box 14, a character film holder 16 formed of a transparent member is fixed by engagement, and on an upper surface of the holder 16, a character film is held by, for example, engagement or partial adhesion.

A surface of the character film 13 (a surface which comes into contact with the photographing film) is desirably set to be on a same plane as a running phase 19 for the photographing film.

FIG. 5 is a strobe flash luminescent diagram, wherein B designates the power source battery; SW-1 designated a power stitch interlockingly operating with the slide button 5; Tr designates a transistor; $R_1$–$R_4$ designate resistors; T is a transformer; D designates a rectifier; $C_1$ and $C_2$ designate condensers; N designates a neon lamp; SW-2 designates a switch which turns ON at a position wherein the shutter blade 12 is fully open (X contact point); CH designates a transformer for trigger; ST1 designates a strobe flash tube for photographing which illuminates the subject; and ST2 designates a strobe flash tube for the character mark which exposes the character film.

Operations thereof will be explained as follows. When the slide button 5 is slid toward right in FIG. 1(a), the power switch SW-1 interlocking the slide button 5 turns ON. Then, a high-voltage and high-frequency current is generated by a circuit formed of the transistor Tr, the resistor $R_1$, and the transformer T, and is rectified at the rectifier D, so that the high-voltage direct current is charged at the condenser $C_1$. Thus, the neon lamp N is a lit to inform an user of completion of preparation for strobe flash photographing.

Then, when the user depresses a release button (not shown), the shutter blade 12 starts opening, and an image of the subject passing through the photographic lens 2 starts to be exposed on the photographing film. At the full open position of the shutter blade 12, a part of the shutter blade pushes the switch SW-2 to turn ON the SW-2, and the high-voltage current charged at the condenser $C_1$ flows to the trigger transformer CH to instantly generate high voltage, so that the strobe flash tubes ST1 and ST2 are triggered. Therefore, the electrodes of the strobe flash tubes ST1 and ST2 electrically discharge, and strobe flash tubes illuminate. Luminescence of the strobe flash tube ST1 lightens the subject, and luminescence of the strobe flash tube ST2 directly exposes the character film 13 so that the film tightly attached thereto is exposed.

Since the luminescence of the strobe flash tube ST2 is only required to directly irradiate the character film 13 so as to expose the photographing film attached tightly thereto, the amount of the luminescence may be very small. Therefore, the resistor $R_4$ is inserted in series to lower the current flowing through the strobe flash tube ST2, to thereby limit the amount of light.

Therefore, in the strobe flash tube ST1 for illuminating the subject, it is possible to ignore decrease of the amount of light due to the strobe flash tube ST2 for the character mark which is connected in parallel thereto.

Figure 6:
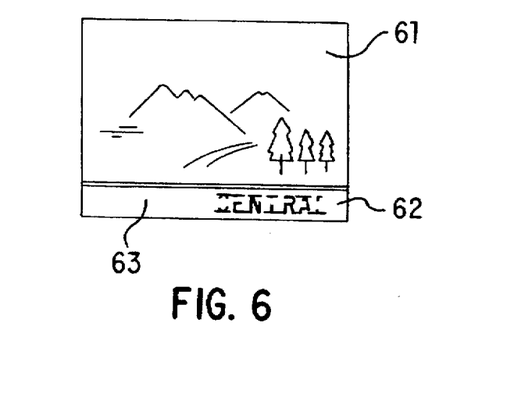
FIG. 6 is an example of a printed picture photographed by the camera of the invention.

FIG. 6 shows an example of a picture into which the photographing film exposed as mentioned above is developed and printed.

In a lower part of the picture 61, a character part 62 appears, and photographing record or the like regarding the picture can be written in a blank space 63 of the character part 62 by a ballpoint pen or the like.

In FIG. 6, in a case of a camera which does not have an automatic exposure mechanism, such as a film with a lens, when the subject is dark such as a night scenery at outside or an indoor scene, the picture 61 is adjusted to be as light as possible in an exposure process of a printing process. On the other hand, when the scene is too bright as in photographing under sunlight at noon, the picture 61 is adjusted to be as dark as possible in the exposure process of the printing process.

Since measurement for adjusting the exposure is usually made near a center area of the picture, the character part 62, for which the exposure is always uniform, is finished relatively bright in case of the picture with a dark subject as if the exposure is slightly too much. In case of the picture with the bright subject, the character part 62 is finished relatively darkly as if the exposure is slightly too little.

Figure 7:
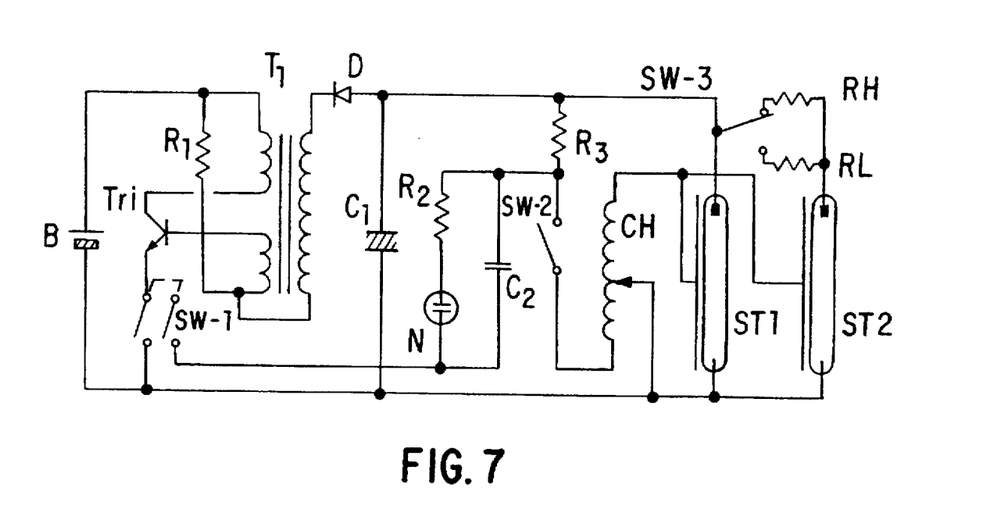
FIG. 7 is a diagram of a strobe flash luminescent circuit according to another embodiment of the invention.
Figure 8:
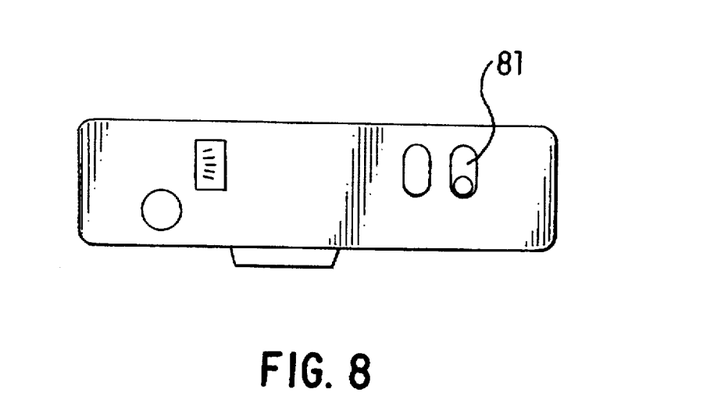
FIG. 8 is a plan view of a camera into which the strobe flash luminescent circuit shown in FIG. 7 is built.

FIGS. 7 and 8 show another embodiment of the invention, which solve this problem. A strobe flash luminescent circuit as shown in FIG. 7 has a plurality of serial resistors in the strobe flash tube ST2, for example, a resistor RH with a high resistance value and a resistor RL with a low resistance value, which can be switched by a switch SW-3.

The other parts are same as in FIG. 5, so that the explanations thereof are omitted herewith.

Numeral 81 in FIG. 8 designates a slide knob for operating the switch SW-3. The slide knob 81 is set to a RH side when the subject is dark, such as a night scenery and an indoor scene, and the slide knob 81 is changed to a RL side when the subject is bright, such as in photographing under sunlight at noon. Thus, adjustment of the exposure at the print process does not effect the character part.

In the above embodiments, it is better to reduce a wiring from the strobe flash tube for exposing the character mark to a substrate of a strobe circuit and to easily assemble the strobe flash tube into the second dark box.

Also, since the length of a luminescent portion of the strobe flash is much shorter than the length of a translucent film for displaying the character mark, exposure or an amount of light at both end portions of the image of the character mark may be extremely deficient.

Furthermore, since resistors are serially connected to a strobe flash tube for exposing the character mark, a discharge current does not flow easily between an anode and a cathode at the moment when trigger voltage is applied, so that the electrical discharge may be insecure.

FIGS. 9(a) through 12 show further embodiments of the present invention to solve the above problems, and to improve the operation of the invention.

Figure 9A:
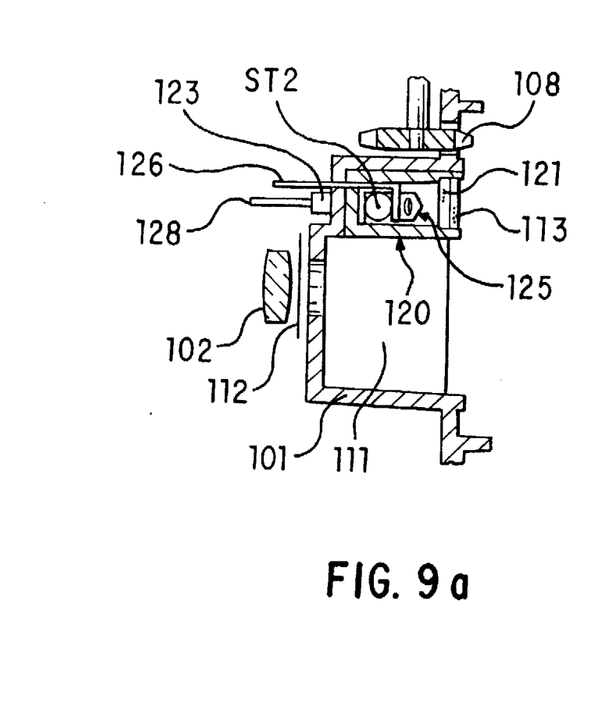
FIG. 9(a) is a sectional view, similar to FIG. 4, of a main part of a further embodiment of the invention.

In FIG. 9(a), numeral 102 designates a photographic lens; 111 designates a first dark box; and 112 designates a shutter blade. Above the first dark box 111, a strobe unit 120 forming a second dark box 114 is embedded in a main body 101 of the camera.

The strobe unit 120 is made of a light shielding synthetic resin or the like, and is formed of four side walls and one low wall. At an open part of the unit 120 on a photographing film side, a transparent character film holder 121 is fixed, and on an upper surface of the holder 121, a character film 113 is attached by, for example, applying dual-side adhesive on both end portions. Numeral 108 designates a sprocket.

Figure 10:
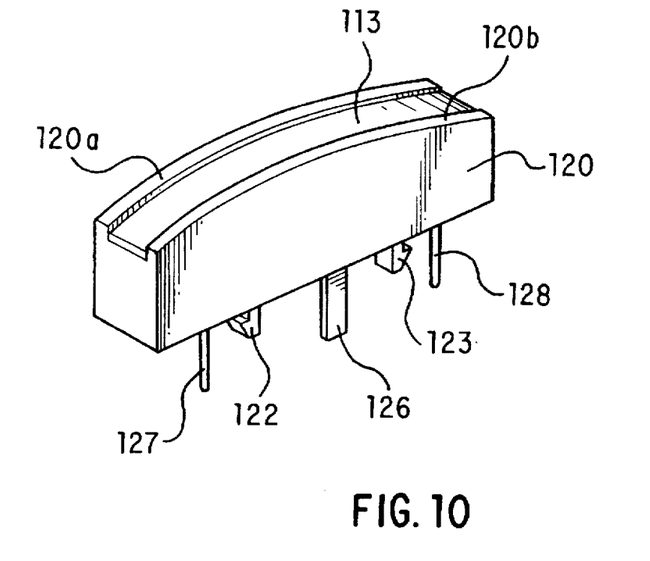
FIG. 10 is a perspective view of a strobe unit.

FIG. 10 is a perspective view of the strobe unit 120, wherein upper end parts 120a, 120b of the side wall in a longitudinal direction form traveling rail phases for a photographing film when the strobe unit 120 is attached to the main body 101 of the camera. A surface of the character film 113 and an emulsion on the photographing film are arranged close to each other without contact, and they are spaced away from each other, for example, with a space of 0.1 mm to 0.2 mm.

Near a bottom of the second dark box 114 in the strobe unit 120, a strobe flash tube for a character mark ST2 (hereinafter, referred as a strobe tube ST2) abuts against a projection at a center of a bottom wall in a state being held by a cover plate 125, and fixed in a position such that flash light illuminates the character film 113 as equally as possible. As an example of a fixing method, an anode terminal wire 127 and a cathode terminal wire 128 of the strobe tube ST2 projecting from the bottom wall of the strobe unit 120 are adhered in the holes.

Figure 11:
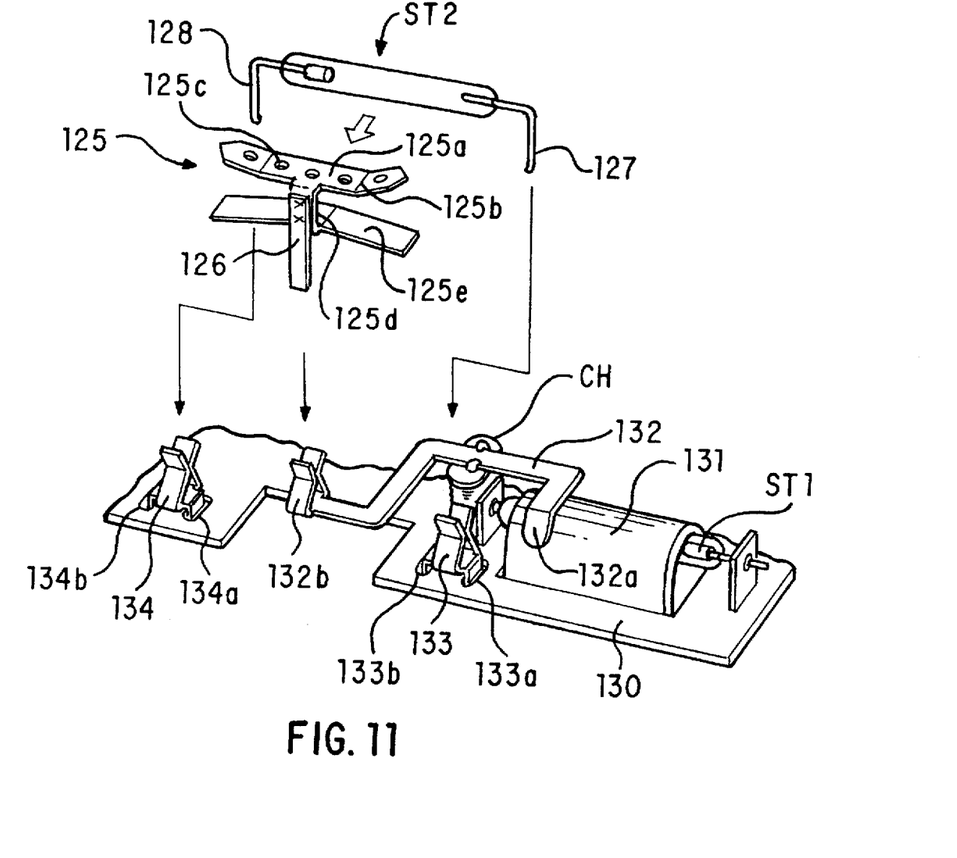
FIG. 11 is an exploded perspective view showing a state that a group of terminals of the strobe unit is to be attached to a strobe flash luminescent circuit of the camera.

As clearly shown in FIG. 11, the cover plate 125 is formed of a shielding plate part 125a, a reflection mirror part 125e and a connection part 125d. A center of the shielding plate part 125a contacts an outer tube wall of the strobe tube ST2, but the distal ends outside portions 125b of the shielding plate part 125a are bent in a direction away from the outer tube wall of the strobe tube ST2.

Figure 9B:
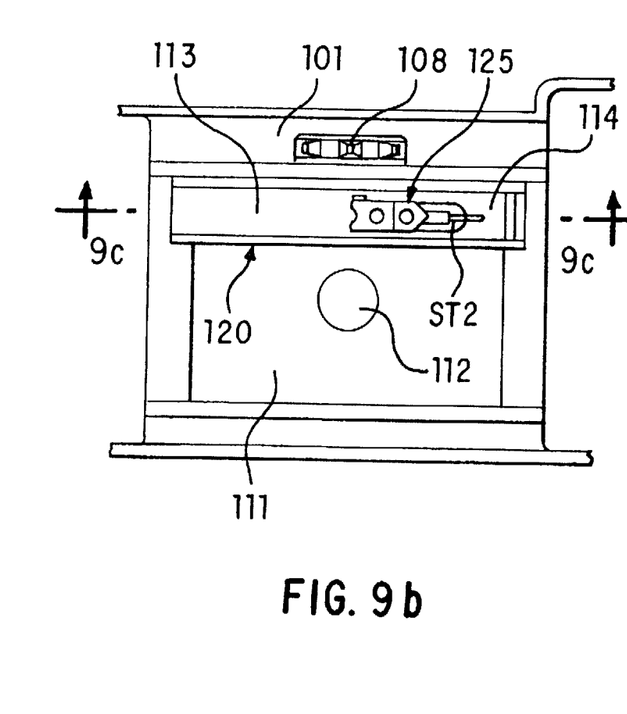
FIG. 9(b) is a rear view of the main part shown in FIG. 9(a)
Figure 9C:
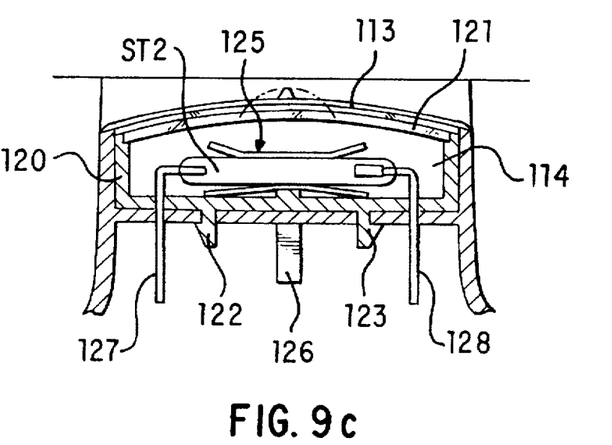
FIG. 9(c) is a sectional view taken along line 9(c)—9(c) in FIG. 9(b)

In the embodiment of FIGS. 9(a)–9(c), in case of 35 mm film camera, the exposure length of the character film 113 has at least 36 mm, but the length of the bottom part of the strobe unit 120 is about 30 mm or less because of the walls of film chambers 9, 10 (FIG. 2) located at both sides in order to make the camera compact, so that the length of the strobe tube ST2 is about 22 mm, and the length of the genuine luminescent portion other than electrode parts is only about 12 mm.

Therefore, in this state, both end parts of the character film 113 are extremely deficient in the amount of light compared to a center part thereof.

To overcome the aforementioned problem, since the amount of light of the strobe tube ST2 can be sufficiently obtained, a center of the shielding plate part 125a of the cover plate 125 covers the outer tube wall of the strobe flash tube ST2, and the distal ends outside the bending positions 125b are bent so that the light of the flash tube ST2 directly illuminates the both end parts of the character film.

In this structure, the amount of light becomes insufficient at the center part of the character film 113, so that appropriate holes 125c, a number and a size of which are determined based on an experiment, are formed at a position symmetrical to the plate part 125a.

To further increase the amount of light at both end parts of the character film 113, in a position symmetrical to the shielding plate part 125a with respect to the strobe tube ST2, there is disposed the reflection mirror part 125e. The reflection mirror part 125e contacts the outer tube wall of the strobe tube ST2 at the center portion, and extends in a V-shape toward both distal ends. The shielding plate part 125a and the reflection mirror part 125e are connected by the connection part 125d. By spring force of the connection part 125d, the shielding plate part 125a and the reflection mirror part 125e are contacted with the outer tube wall of the strobe tube ST2 so as to sandwich the same therebetween. Since the shielding plate part 125a and the reflection mirror part 125e can also function as a trigger electrode of the strobe ST2, a trigger terminal plate 126 is integrally fixed to the connection part 125d by spot welding. A distal end of the trigger terminal plate 126 projects from the bottom wall of the strobe unit 120 as shown in FIG. 9(a).

In FIG. 11, numeral 130 designates a substrate of the strobe circuit, in which the circuit of FIG. 7 is disposed, and a part thereof is shown. The ST1 designates the strobe flash tube for photographing; numeral 131 designates a reflection mirror for the strobe tube ST2; CH designates a transformer for generating high voltage for triggering; and 132 designates a trigger wiring plate. One end 132a of the wiring plate 132 contacts by its spring force the reflection mirror 131 for also functioning as the trigger electrode, and the other end forms a trigger terminal 132b.

Numeral 133 designates an anode terminal of the strobe tube ST2, which is soldered at projections 133a, 133b onto a pattern of the substrate 130, and 134 designates a cathode terminal of the strobe tube ST2, which is soldered at projections 134a, 134b onto the pattern of the substrate 130.

The strobe unit 120 constructed as described above is fixed to the main body 101 by fitting hooks 122, 123, which are integral with the bottom wall and project therefrom, into hook holes formed in the main body 101 by elastic force.

At the same time, the anode terminal wire 127 of the strobe tube ST2 is clipped by the anode terminal 133 disposed in the substrate 130 to be connected to the same, a cathode terminal wire 128 is clipped by the cathode terminal 134 to be connected thereto, and the trigger terminal plate 126 is clipped by the trigger terminal 132b to be connected thereto.

The above strobe unit 120 can be connected to the circuit as shown in FIG. 5 and operated as explained before.

In the circuit shown in FIG. 5, since the resistor $R_4$ is connected in series to the strobe tube ST2, when the trigger voltage is applied to the strobe tube ST2, an electrical discharge between an anode and a cathode becomes difficult due to the resistor $R_4$ to cause insecure electrical discharge.

Figure 12:
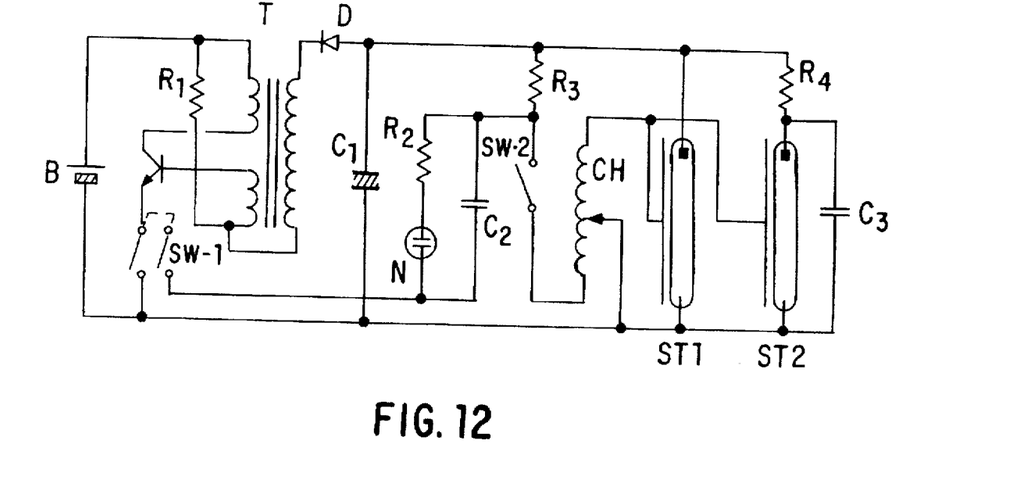
FIG. 12 is a wiring diagram of the strobe flash luminescent circuit according to a still further embodiment of the invention.

To prevent the above problem, as shown in FIG. 12, a condenser $C_3$ is connected parallel to the strobe tube ST2 and always charges an electric current so as to enable to discharge the same when the trigger voltage is applied, to thereby facilitate an electrical discharge between the anode and the cathode.

In the foregoing, although it is described that the second dark box 114 is located above the first dark box 111, the second dark box 114 can be disposed under the first dark box 111, or at a side, not a bottom, of the first dark box 111 (length of 24 mm in case of the 35 mm film). The character mark may be formed at a part of one side, not one full side.

Similarly, the invention is not limited to above described embodiments, and the embodiments can be modified in a range of the subject matter of the invention.

According to the present invention, by directly using the strobe flash tube as a light source for the character mark disposed in the second dark box, an electrical wiring is only required instead of arranging the photoconductor, such as an optical fiber as in the prior art. Also, most parts of the strobe flash circuit for illuminating the subject can be used in common. Therefore, a manufacturing cost can be extremely reduced.

Also, in case of the elongated rectangular character image, since the luminescence emitted from an elongated strobe flash tube is an elongated light, the elongated rectangular character mark can be equally exposed in the entire length thereof easily and inexpensively.

Further, the luminescence of the strobe flash tube is directly used as the light source for the character mark. In this case, since a color temperature of the strobe flash light and the daylight color film are substantially the same, it is not required to adjust a color temperature of the character film.

Also, even when unevenness of the exposure in the photographing film due to the difference in the brightness of the subject is adjusted at the exposure step of the printing process, by switching the resistor of the strobe flash tube for the character mark, the exposure of the printed character mark can be adjusted in accordance with the brightness of the subject.

According to the other aspects of the present invention, the second dark box is structured as a unit such that the strobe flash tube is built therein as a light source for the character mark and the unit is fitted to a unit fitting part disposed in the main body of the camera. Therefore, there is no need for incorporating the strobe flash tube for the character mark into the main body of the camera, and installation of the strobe flash tube for the character mark is facilitated.

Since the second dark box is constructed as the unit and the character film is attached to the unit, one unit can respond to various kinds of character films. Even if various display devices have to keep as stocks, only the unit is effected, not camera.

The outer wall of the unit is provided with the terminals connected to the anode, cathode and trigger of the strobe flash tube, and the unit is fixed to the unit fitting part disposed in the main body of the camera to thereby connect the unit onto the substrate of the strobe flash circuit of the camera. Accordingly, wiring processes can be tremendously reduced.

Since the outer tube wall of the strobe flash tube facing the character film is provided with the shielding plate so as to equally expose the character film, the deficiency in the amount of light for exposure both end parts of the character image can be solved.

By connecting a condenser in parallel between the anode and cathode of the strobe flash tube as the character light source, electrical discharge of the strobe flash tube as the character light source can be made without fail.

While the invention has been explained with reference to the specific embodiments of the invention, the explanation is illustrative and the invention is limited only by the appended claims.

What is claimed is:

1. A camera with a character mark display device, comprising:

a main body including a photographic lens, an exposure portion adapted to locate a photographic film, and a dark box disposed between the photographic lens and the exposure portion, a light shielding wall disposed in the dark box for dividing the dark box into a first dark section and a second dark section, said photographic lens being located in the first dark section for exposing an image of a subject passing through the photographic lens onto the photographing film, a character film for displaying a character mark disposed in the second dark section, said character film being situated adjacent to a part of the photographic film, and a light source for exposing the character mark onto the part of the photographic film, said light source being a first strobe flash tube disposed in the second dark section so that when a shutter for the lens is opened, the first strobe flash tube is irradiated to expose the character mark onto the photographic film.

2. A camera with a character mark display device according to claim 1, further comprising a second strobe flash tube as a flash light source for illuminating the subject, a first luminescent circuit for the first strobe flash tube, and a second luminescent circuit for the second strobe flash tube, at least a part of said first luminescent circuit being used in common with the second luminescent circuit.

3. A camera with a character mark display device according to claim 2, wherein said first strobe flash tube is connected parallel to the second strobe flash tube.

4. A camera with a character mark display device according to claim 3, further comprising a resistor connected in series to the first strobe flash tube, said second strobe flash tube being disposed parallel to a series connection of the resistor and the first strobe flash tube.

5. A camera with a character mark display device according to claim 4, wherein said resistor is formed of a plurality of resistors, one of said plurality of resistors being switched to another of the plurality of resistors by a switch.

6. A camera with a character mark display device according to claim 4, further comprising a condenser situated parallel between an anode and a cathode of the first strobe flash tube.

7. A camera with a character mark display device according to claim 1, wherein said main body includes a unit fitting part in the second dark section; and said light shielding wall is formed of a unit for enclosing the second dark section, said unit including side walls, a bottom part and a front part for holding the character film thereon and located near the photographic film, said unit receiving the first strobe flash tube therein and being attached to the unit fitting part at the bottom part.

8. A camera with a character mark display device according to claim 7, wherein said unit includes an anode, a cathode and a trigger for the first strobe flash tube, and terminals thereof; and said main body includes a second strobe flash tube as a flash light source for illuminating the subject and a luminescent circuit of the first and second strobe flash tubes, at least one of the terminals for the first strobe flash tube being connected to a terminal of the luminescent circuit on the main body.

9. A camera with a character mark display device according to claim 1, further comprising a shielding wall situated outside the first strobe flash tube at a side of the character film to equally expose the character film by the first strobe flash tube.

10. A camera with a character mark display device according to claim 9, wherein said shielding wall includes at least one opening and two lateral end portions bent in a direction away from the first strobe flash tube.

11. A camera with a character mark display device according to claim 9, wherein said shielding wall functions as a trigger electrode.

* * * * *